United States Patent [19]

Sueyoshi

[11] Patent Number: 4,654,718
[45] Date of Patent: Mar. 31, 1987

[54] EQUIPMENT FOR NOTIFYING THE ARRIVAL OF A CORRESPONDENCE AT A FACSIMILE RECEIVER, TO THE ULTIMATE ADDRESSEE THEREOF

[75] Inventor: Toru Sueyoshi, Tokyo, Japan

[73] Assignee: Fuji Photo Film Co., Ltd., Kanagawa Prefecture, Japan

[21] Appl. No.: 557,588

[22] Filed: Dec. 2, 1983

[30] Foreign Application Priority Data

Dec. 29, 1982 [JP] Japan .................................. 57-233393

[51] Int. Cl.⁴ ............................................. H04N 1/32
[52] U.S. Cl. ..................................... 358/257; 382/11; 379/100
[58] Field of Search .............. 358/257, 256; 179/18 B, 179/6.02, 2 DP, 2 A; 382/11

[56] References Cited

U.S. PATENT DOCUMENTS 3,084,213  4/1963  Lemelson ........................... 358/257
3,832,686  8/1974  Bilgutay ................................ 382/11
4,113,991  9/1978  Gorham et al. ..................... 358/257
4,506,111  3/1985  Takenouchi et al. .............. 179/2 A Primary Examiner—James J. Groody
Assistant Examiner—John K. Peng
Attorney, Agent, or Firm—Berman, Aisenberg & Platt

[57] ABSTRACT

An equipment which is attached to a facsimile receiver and which notifies the arrival of a correspondence at a facsimile receiver, to the ultimate addressee of the correspondence, the equipment being provided with a means for identifying the telephone number of the ultimate addressee of a facsimile receiver, for memorizing the telephone number and for outputting a signal representing the telephone number, a means for operating a telephone exchanger, an announcing machine and a line disconnecting means, and preferably with a dialing signal repeating means and a signal inhibiting means, and further preferably with a signal selective distribution means.

13 Claims, 5 Drawing Figures

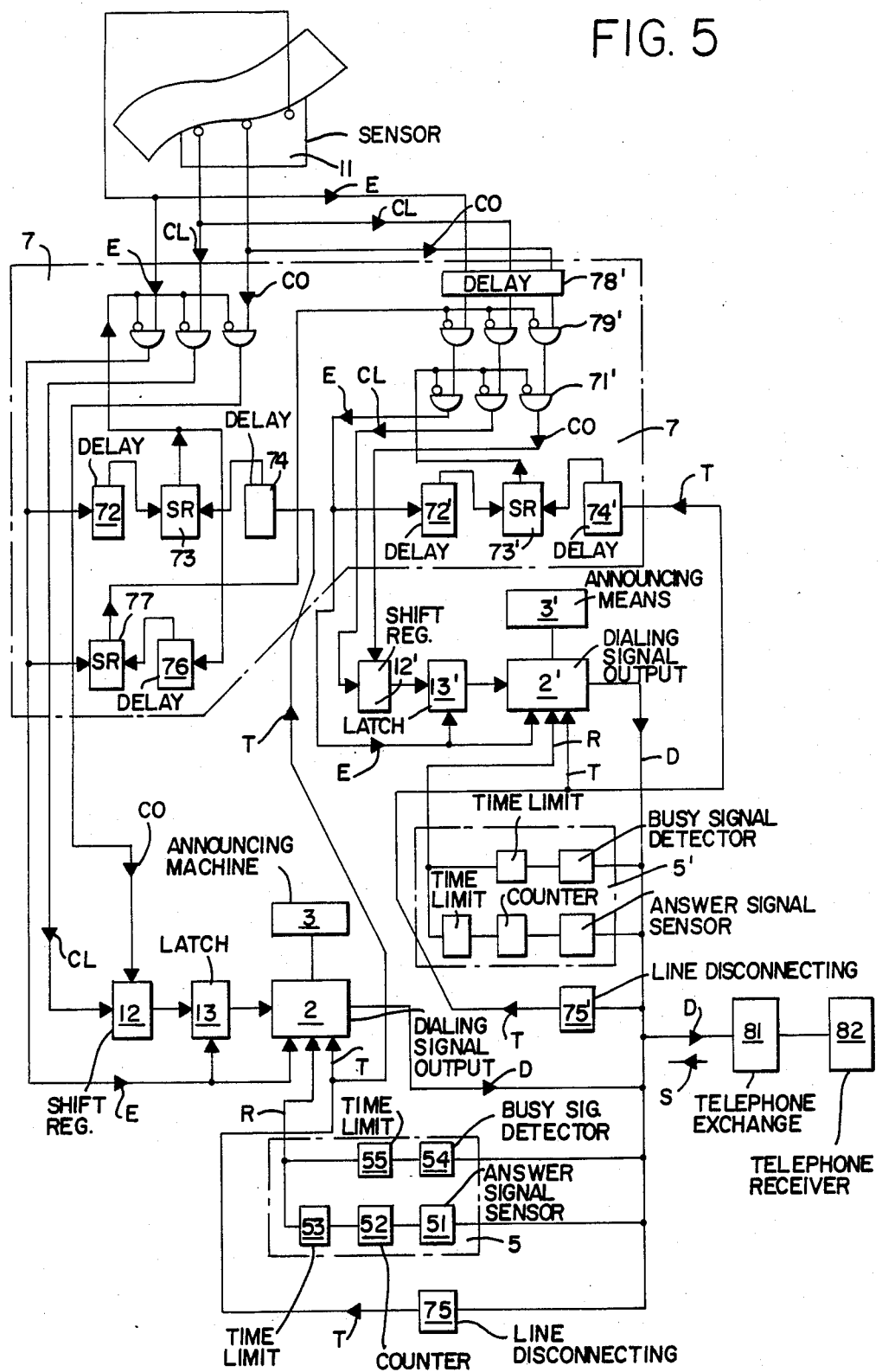

EQUIPMENT FOR NOTIFYING THE ARRIVAL OF A CORRESPONDENCE AT A FACSIMILE RECEIVER, TO THE ULTIMATE ADDRESSEE THEREOF

FIELD OF THE INVENTION

This invention relates to an equipment which is attached to a facsimile receiver and which notifies the arrival of a correspondence which has arrived at a facsimile receiver, toward the ultimate addressee of the correspondence.

BACKGROUND OF THE INVENTION AND PRIOR ART STATEMENT

A facsimile system is an electronic system which transmits a graphic matter (as printing or still pictures) by wire or radio. Predominantly due to cost-wise parameters, facsimile systems are at present utilized for the purposes of station-to-station type communication rather than for the purposes of person-to-person type communication. Therefore, some type of delivery system is essential to deliver each piece of correspondence which has arrived at a facsimile station, toward the ultimate addressee of the correspondence, because it is impossible to transfer graphic matters by any oral means.

On the other hand, a facsimile system is classified into two, the inter-subscriber facsimile system and the in-house facsimile system. The former is a system which connects different subscribers through public tele-communication lines, and the latter is a system which connects different facsimile receivers owned by one subscriber.

Available in the prior art is a system which identifies, upon receipt of a piece of facsimile correspondence tansmitted through a public or inter-subscriber facsimile system, one of the in-house facsimile receivers at which the piece of correspondence is preferably printed out and connects the public line through which the received piece of correspondence has been transmitted, with an inhouse line which reaches the identified in-house facsimile receiver, thereby the received piece of corresponce can be printed out by the facsimile receiver which is located close to the ultimate addressee of the received piece of correspondence.

The foregoing prior art system is not necessarily satisfactory, unless a facsimile receiver is available for every individual or at least every small group of people.

Therefore, it is required to develop an equipment for notifying the arrival of a correspondence of a facsimile receiver, to the ultimate addressee of the arrived correspondence, because this equipment is useful particularly for an in-house facsimile system.

OBJECTS AND SUMMARY OF THE INVENTION

A first object of this invention is to provide an equipment which is attached to a facsimile receiver and which identifies, upon receipt of a piece of correspondence through a facsimile system particularly through an in-house facsimile system, the telephone number of the ultimate addressee of the arrived piece of correspondence, connects a line with the identified telephone receiver, and sends a recorded message to the identified telephone receiver, thereby informing the ultimate addressee of the arrived piece of correspondence, of the arrival of a facsimile correspondence.

A second object of this invention is to provide an equipment which has the foregoing function and an additional function in which such a calling to the identified ultimate addressee is repeated, if the identified telephone receiver is busy or unanswered for a predetermined length of time.

A third object of this invention is to provide an equipment which has the foregoing functions and an additional function in which two independent but successive pieces of facsimile correspondence can be accepted, even if the second one of the two successive pieces arrives, before calling is not yet completed for the first one of the two successive pieces of correspondence.

To achieve the foregoing first object, an equipment for notifing the arrival of a correspondence at a facsimile receiver, to the ultimate addressee thereof in accordance with the first embodiment of this invention is provided with (a) a means for identifing the telephone number of the ultimate addressee of a facsimile correspondence whih has arrived at a facsimile receiver, for memeorizing the identified telephone number and for outputting a coded signal representing the identified telephone number, (b) a means for outputting a dialing signal to a telephone exchanger in response to the coded signal, for the purpose to connect a line with the identified telephone receiver, (c) an announcing machine which starts operation in response to a connection signal which is outputted by the telephone exchanger, for the purpose to transmit a message including a notice of the arrival of a correspondence to the ultimate addressee, and (d) a means for disconnecting the line from the identified telephone receiver, after the calling to the ultimate addressee is successfully completed or in the case where a line is not connected with the identified telephone receiver for a predetermined length of time.

To achieve the foregoing second object, an equipment for notifying the arrival of a correspondence at a facsimile receiver, to the ultimate addressee thereof in accordance with the second embodiment of this invention is provided with (a) a means for identifying the telephone number of the ultimate addressee of a facsimile correspondence which has arrived at a facsimile receiver, for memorising the identified telephone number and for outputting a coded signal representing the identified telephone number, (b) a means for outputting a dialing signal to a telephone exchanger in response to the coded signal, for the purpose to connect a line with the identified telephone receiver, (c) a means for causing the dialing signal outputting means to repeat the dialing signal outputting operation in the cases where a line is not connected with the identified telephone receiver, (d) an announcing machine which starts operation in response to a connection signal which is outputted by the telephone exchanger, for the purpose to transmit a message including a notice of the arrival of a correspondence to the ultimate addressee, (e) a means for inhibitting the operation of the telephone number identifying means, during the period wherein a call is being carried out, and (f) a means for disconnecting the line from the identified telephone receiver in response to a call completion signal.

To achieve the foregoing third object, an equipment for notifying the arrival of a correspondence at a facsimile receiver, to the ultimate addressee thereof in accordance with the third embodiment of this invention is provided with (a) a means for identifying the telephone number of the ultimate addressee of a facsimile correspondence which has arrived at a facsimile receiver and for outputting a coded signal representing the identified telephone number, (b) two units of combined means each of which comprises (i) a means for memorizing the identified telephone number, (ii) a means for outputting a dialing signal to a telephone exchanger in response to the coded signal, for the purpose to connect a line with the identified telephone receiver, (iii) a means for causing the dialing signal outputting means to repeat the dialing signal outputting operation in the cases where a line is not connected with the identified telephone receiver, (iv) an announcing machine which starts operation in response to a connection signal, and (v) a means for disconnecting the line from the identified telephone receiver in response to a call completion signal, and (c) a means for selective distribution of the output coded signals of the telephone number identifying means, consisting of (i) a first subunit which further consists of a circuit which inhibits a coded signal which has been inputted to the first subunit, from being inputted to the second subunit and a circuit which inhibits any coded signal from being inputted to the first subunit during the period in which the first one of the combined means is operating and (ii) a second subunit which further consists of a circuit which inhibits a coded signal which has been inputted to the first subunit, from being inputted to the second subunit and a circuit which inhibits any coded signal from being inputted to the second subunit during the period in which the second one of the combined means is operating.

BRIEF DESCRIPTION OF DRAWINGS

This invention, together with its various features and advantages, can be readily understood from the following more detailed description presented in conjunction with the following drawings, in which:

FIG. 5 is a schematic block diagram of an equipment for notifying the arrival of a correspondence which has arrived at a facsimile receiver, to the ultimate addressee thereof in accordance with the third embodiment of this invention.

DETAILED DESCRIPTION

Described below will be one each of the foregoing embodiments of this invention.

EMBODIMENT 1

Figure 1:
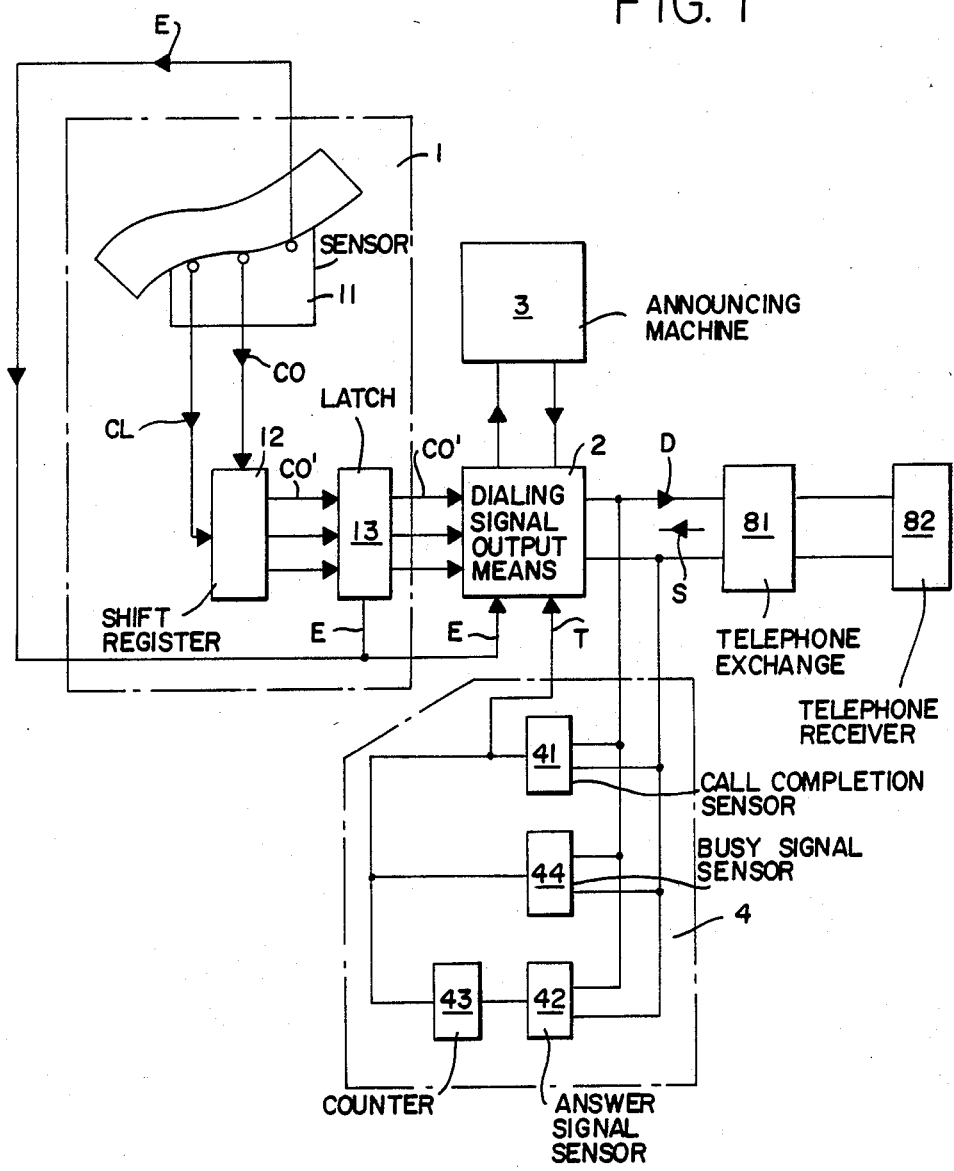
FIG. 1 is a schematic block diagram of an equipment for notifying the arrival of a correspondence which has arrived at a facsimile receiver, to the ultimate addressee thereof in accordance with the first embodiment of this invention.
Figure 2:
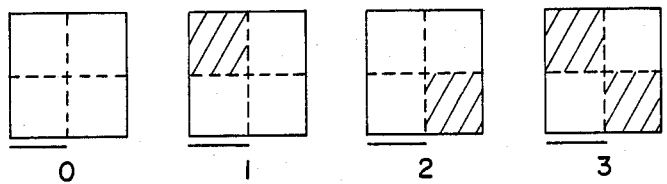
FIG. 2 is an exemplary identification mark of a telephone number in which the telephone number is preceded by a prefix.
Figure 3:
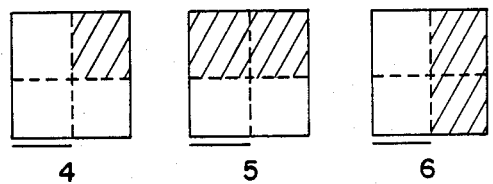
FIG. 3 is a set of symbolic characters each of which represents each numeral from 0 to 9.
Figure 3:
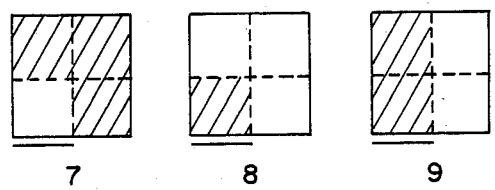

Referring to FIG. 1, an optical character reader (hereinafter referred to as an OCR) or a mark sensor (hereinafter referred to as an MS) 11 which is arranged in the pass of a sheet which carries a piece of facsimile correspondence printed thereon, reads or senses the telephone number of the ultimate addressee of the facsimile correspondence. The telephone number is shown (a) at a specific location of the sheet e.g. the top left of the sheet, (b) with a specific symbol such as a prefix or a set of prefix and suffix which precedes or confines the telephone number e.g. as shown in FIG. 2, or (c) in symbolic characters such as graphic characters e.g. as shown in FIG. 3. The OCR or MS 11 outputs a set of signals including a clock signal CL, a code signal CO and an end signal E. The clock signal CL and the code signal CO are inputted to a shift register 12 for the purpose to convert the series code signal CO to a parallel code signal CO', which is inputted to a ratch 13 together with the end signal E which functions as a trigger signal for the ratch 13. In this embodiment, these three elements including the OCR or MS 11, the shift register 12 and the ratch 13 constitute a means 1 for identifying the telephone number of the ultimate addressee of a facsimile correspondence which has arrived at a facsimile receiver, for memorizing the identified telephone number and for outputting a coded signal representing the identified telephone number.

In response to the end signal E functioning as a trigger signal, the ratch 13 receives the parallel code signal CO'. Further, in response to the end signal E functioning as a trigger signal, a means for outputting a dialing signal 2 receives the parallel code signal CO' and outputs a dialing signal D toward a telephone exchanger 81, which connects a line with the identified telephone receiver 82.

Provided the identified telephone receiver 82 is unhooked (or answered) and a line is successfully connected with the identified telephone receiver 82, a connection signal S returns to the dialing signal outputting means 2 from the telephone exchanger 81. In response to this connection signal S, an announcing machine 3 which actually is an endless tape recorder starts operation and transmits a recorded message including a notice of the arrival of a correspondence to the identified telephone receiver 82. When the identified telephone receiver 82 is hooked, a call completion sensor 41 operates to output a call termination signal T to the dialing signal outputting means 2 for the purpose to disconnect the line from the identified telephone receiver 82. In this manner, the function of this equipment is successfully completed. Incidentally, in the case where the identified telephone receiver 82 is not unhooked (or answered) for a predetermined length of time and a counter 43 which starts the counting operation in response to an answer signal sensor 42, counts out, or in the case where a busy signal sensor 44 detects a busy signal, a call termination signal T is outputted to the dialing signal outputting means 2 to disconnect the line from the identified telephone receiver 82. In this embodiment, the call completion sensor 41, the answered signal sensor 42, the counter 43 and the busy signal sensor 44 constitute a means 4 for disconnecting the line from the identified telephone receiver, when the identified telephone receiver is hooked after it is once unhooked or the line is not connected with the identified telephone receiver.

The foregoing description has clarified that the first object of this invention is successfully achieved. In other words, the foregoing equipment has a function to identify the telephone number of the ultimate addressee of a facsimile correspondence which has arrived at a facsimile receiver and to transmit a previously recorded message (an announcement) including a notice of the arrival of a correspondence to the ultimate addressee of the facsimile correspondence. The function of this embodiment is, however, limited to the extent wherein the attempt for transmitting a message is conducted only one time or the equipment does not repeat calling, in the cases where the identified telephone is busy or unanswered. In other words, if the identified telephone is busy or unanswered, the identified telephone receiver has no more chances to receive the information.

EMBODIMENT 2

The second embodiment overcomes the aforementioned drawback which occurs in the cases where the identified telephone is busy or unanswered.

Figure 4:
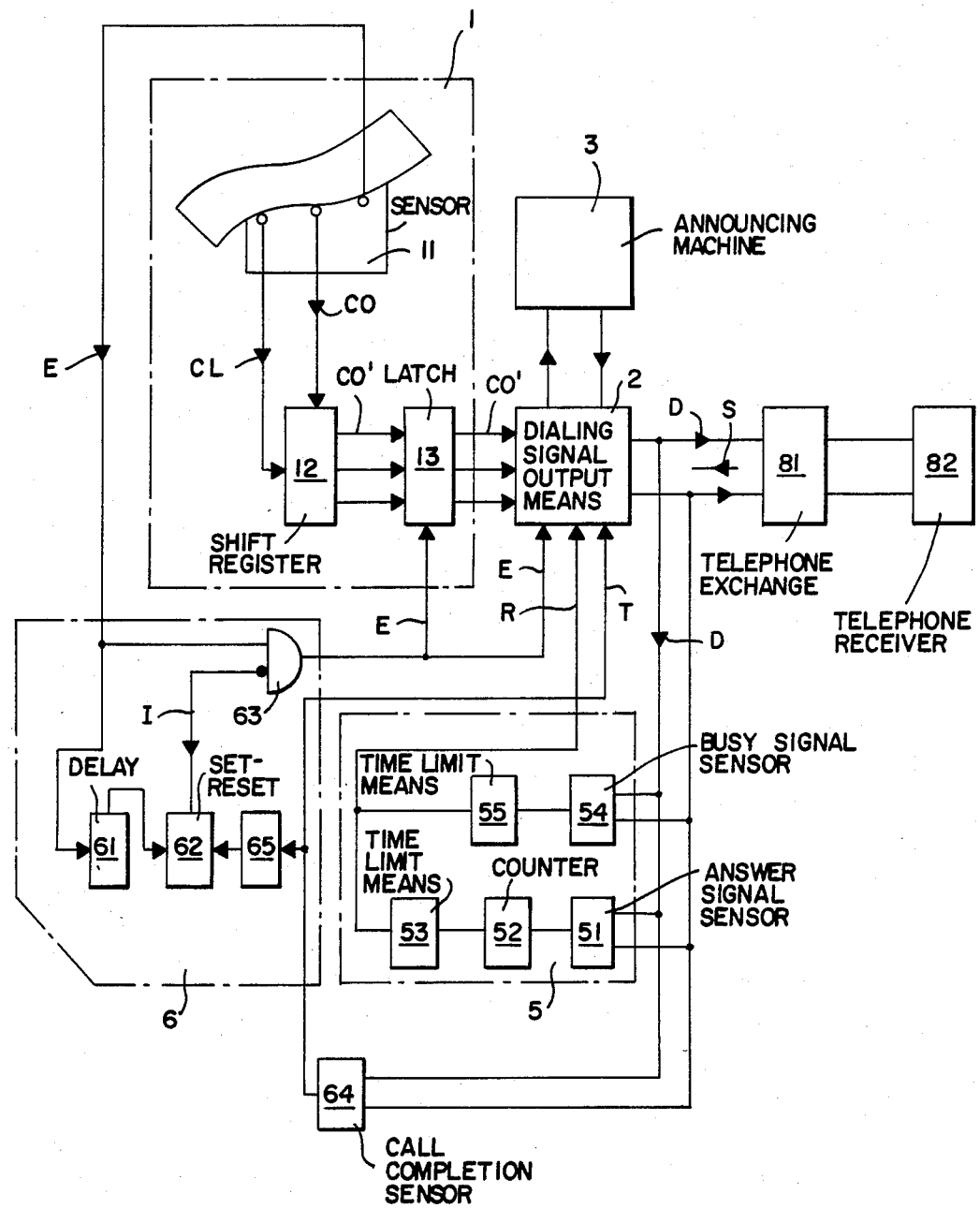
FIG. 4 is a schematic block diagram of an equipment for notifying the arrival of a correspondence which has arrived at a facsimile receiver, to the ultimate addressee thereof in accordance with the second embodiment of this invention.

Referring to FIG. 4, a means 1 for identifying the telephone number of the ultimate addressee of a facsimile correspondence which has arrived at a facsimile receiver, for memorizing the identified telephone number and for outputting a coded signal representing the identified telephone number, which is identical to that of the first embodiment, reads or senses the telephone number of the ultimate addressee, memorizes the identified telephone number, and outputs a parallel code signal CO' to a means for outputting a dialing signal 2. However, an end signal E is also inputted to a delay element 61 which sets a setreset register 62 which outputs a signal I which is inputted to an inhibiting AND gate 63 to inhibit the end signal E from being inputted to a ratch 13 and the dialing signal outputting means 2 during the period in which the set-reset register 62 is set, thereby the content of the ratch 13 is safely maintained until a call is completed. As is in the case of the first embodiment, the dialing signal outputting means 2, in response to the end signal E, outputs a dialing signal D toward a telephone exchanger 81, which connects a line with the identified telephone receiver 82. When the identified telephone receiver 82 is unhooked (or answered) and a line is successfully connected with the identified telephone receiver 82, a connection signal S returns to the dialing signal outputting means 2 from the telephone exchanger 81. In response to this connection signal S, an announcing machine 3 starts operation to transmit a recorded message to the identified telephone receiver 82. When a call is completed and a call completion sensor 64 operates, a call termination signal T is inputted to the dialing signal outputting means 2 and the line is disconnected from the identified telephone receiver 82. The call termination signal T is also inputted to the set-reset register 62 through a delay element 65 to reset the set-reset register 62 slightly after the dialing signal outputting means 2 disconnected the line from the identified telephone receiver 82, thereby the inhibiting AND gate 63 is released to allow an end signal E (the next one) to reach the ratch 13 and the dialing signal outputting means 2, provided it is inputted after the previous calling is completed. In this embodiment, the delay element 61, the set-reset register 62, the inhibiting AND gate 63 and the delay element 63 constitute a means 6 for inhibiting the operation of the means 1 for identifying the telephone number of the ultimate addressee, during the period wherein a calling is carried out. The call completion sensor 64 functions as a means for disconnecting the line from the identified telephone receiver in response to a call completion signal. In contrast, if the identified telephone receiver is unanswered, an answer signal sensor 51 operates, and if the identified telephone receiver is busy, a busy signal sensor 54 operates. Thus a calling is repeated in response to a calling repetition signal R which is outputted by a first time limiting means 53 which starts the time limiting operation in response to the counting out of a counter 52 which starts counting in response to the answer signal sensor 51, and by a second time limiting means 55 which starts the time limiting operation in response to the busy signal sensor 54. (When a line is bysy, it is realistic to wait some length of time until the second calling is placed.) In other words, this equipment repeats calling until the message including a notice of the arrival of a correspondence is transmitted to the ultimate addressee, even if the identified telephone receiver 82 is busy or unanswered. In this embodiment, the answer signal sensor 51, the counter 52, the first time limiting means 53, the busy signal sensor 54 and the second time limiting means 55 constitute a means 5 for causing the dialing signal outputting means to repeat the dialing signal outputting operation in the cases where the line is not connected with the identified telephone receiver.

The foregoing description has clarified that the second object of this invention is successfully achieved. In other words, the foregoing equipment has the function to identify the telephone number of the ultimate addresses of a facsimile correspondence and to repeat callings to the identified ultimate addreseee, for the ultimate purpose to transmit a recorded message to him or her, until the identified telephone receiver is once unhooked and hooked.

This embodiment is involved with a drawback in which this equipment does not respond to a second piece of facsimile correspondence which has arrived in succession during the period in which a calling is still being carried out for ap revious piece of correspondence. In other words, if two successive pieces of correspondence have arrived during the period in which this equipment repeats calling to the ultimate addressee of a previous piece of correspondence, no callings will be made to the ultimate addressee of the second one of the aforementioned two successive pieces of correspondence.

EMBODIMENT 3

The third embodiment overcomes the aforementioned drawback which occurs under the circumstances where (1) two successive pieces of correspondence arrive and (2) a telephone receiver which is located close to the ultimate addressee of the first one of the aforementioned two successive pieces of corrspondence is busy or unanswered for a relatively long time.

Referring to FIG. 5, the third embodiment of this invention consists of the following units.

(1) One set of OCR or MS 11, which is identical to that which is employed for the first and second embodiment.

(2) Two sets of combined means comprising (i) signal memorizing means 12 and 13, (ii) dialing signal outputting means 2, (iii) dialing signal repeating means 5, (iv) announcing machine 3 and (v) a line disconnecting means 75, each of which is identical to that which is employed for the second embodiment.

(3) A set of signal distribution means 7, which consists of (i) a first subunit which further consists of an inhibitting AND gate 71, a delay element 72, a set-reset register 73, a delay element 74, a delay element 76 and a set-reset register 77, and (ii) a second subunit which further consists of a delay element 78', an inhibiting AND gate 79', an inhibiting AND gate 71', a delay element 72', a set-reset register 73', and a delay element 74', thereby (a) an end signal E is allowed to pass through the first subunit, provided both subunits are vacant and (b) the second end signal E is transferred to the second subunit, provided the first subunit is occupied or (c) the second end signal E is allowed to pass through the first subunit, provided the first subunit is vacant, resultantly enabling two successive signals outputted by the OCR or MS 11 to be inputted to either of the subunits which are selected in the aforementioned manner.

An OCR or an MS 11 reads or senses the telephone number of the ultimate addressee and outputs a clock signal CL, a code signal CO and an end signal E. Each set of these signals outputted by the OCR or MS 11 must pass through a means 7 for selective distribution of the output signals of the telephone number identifying means, before being inputted to one of the combined means each of which consists of (i) a means for memorizing the identified telephone number 12 and 13, (ii) a dialing signal outputting means 2, (iii) a dialing signal repeating means 5, (iv) an announcing machine 3 and (v) a line disconnecting means 75.

Provided none of the first and second subunits of the signal distribution means 7 has been inputted a set of signals including CL, CO and E, the first set of signals is allowed to pass through the inhibiting AND gate 71 of the first subunit of the signal distribution means 7, because the gate is still open. As a result, the clock signal CL and the code signal CO are inputted to the first set of the combined means consisting of (i) signal memorizing means 12 and 13, (ii) dialing signal outputting means 2, (iii) dialing signal repeating means 5, (iv) announcing means 3 and (v) a line disconnecting means 75. As is in the case of the second embodiment, a telephone receiver 82 which is located close to the ultimate addressee of the identified piece of correspondence, is identified and a calling is repeated in response to a call repetition signal R, until the identified telephone receiver 82 is unhooked. When the call is completed or more specifically when the identified telephone receiver 82 is hooked, the line is disconnected from the identified telephone receiver in response to a call termination signal T, which terminates the operation of the first set of the combined means.

Incidentally, the end signal E which has passed through the inhibiting AND gate 71 of the first subunit of the signal distribution means 7 is inputted to the set-reset register 77, which operates the inhibiting AND gate 79' of the second subunit of the signal distribution means 7, which inhibits a set of signals containing the end signal E identical to that which was described above, from being inputted to the second subunit of the signal distribution means 7 during the period in which the inhibiting AND gate 79' is closed. The function of the delay element 78' is to suspend the progress of a set of signals during the period between the time at which the set of signals is inputted to the signal distribution means 7 and the operation of the inhibiting AND gate 79' of the second subunit of the signal distribution means 7, thereby a set of signals can be inhibited from being inputted to the second subunit, in the case where the same set is inputted to the first set of the combined means and also can be allowed to pass through the second subunit, in the case where the first set of the combined means is in operation.

Further, the same end signal E, passing through the delay element 72, is inputted to the set-reset register 73 of the first subunit, which operates the inhibiting AND gate 71 of the first subunit for the purpose to inhibit any signal from being inputted to the first set of combined means, until the first set of combined means finishes a call. This set-reset register 73 of the first subunit is reset, after the first set of combined means finishes a calling and outputs a call completion signal T, which is applied to the set-reset register 73, after passing through the delay element 74.

When the set-reset register 73 of the first subunit is set or when the inhibiting AND gate 71 of the first subunit is closed, the set-reset register 77 of the first subunit is reset by a set signal of the set-reset register 73 and which passes through the delay element 76 before being inputted to the set-reset register 77. By this operation, the inhibiting AND gate 79' of the second subunit is clsoed only during the period in which the first subunit is being inputted with a signal.

The second set of signals which is applied during the period in which the first set of the combined means is under operation, is allowed to be inputted to the second set of combined means, passing through the second subunit of the signal distribution means 7, because the inhibiting AND gate 71 of the first subunit is closed, and the inhibiting AND gate 79' of the second subunit is open excepting during the period in which a set of signals is passing through the first subunit and the inhibiting AND gate 71' is still open due to the reset position of the set-reset register 73' of the second subunit. As a result, the second set of the combined means is triggered by this set of signals.

If the second set of signals is applied, after the first set of the combined means has finished calling, the set of signals is inputted to the first set of combined means rather than the second set of combined means.

The foregoing description has clarified that the third object of this invention is successfully achieved. In other words, the foregoing equipment has a function (predominantly realized by the signal distribution means 7) to accept two independent but successive pieces of facsimile correspondence, even if the second one of the two successive pieces arrives, before calling is not yet completed for the first one of the two successive pieces of correspondense, in addition to the function to identify the telephone number of the ultimate addressee of a facsimile correspondence and to repeat an operation in which a recorded message including a notice of the arrival of a correspondence is transmitted to the identified ultimate addressee, until the identified telephone receiver is once unhooked and hooked (which is the function identical to that of the second embodiment).

Albeit this invention has been described with reference to specific embodiments, this description is not meant to be construed in a limiting sense. Various modifications of the described embodiments, as well as other embodiments of this invention, will become apparent to persons skilled in the art upon reference to the description of the present invention. It is therefore contemplated that the apended claims will cover any such modifications or embodiments as fall within the true scope of this invention.

What is claimed is:

1. Equipment for receiving a facsimile correspondence and for notifying an ultimate addressee of a plurality of ultimate addressees of the arrival of said correspondence comprising:

receiving means for receiving signals representing a message and a telephone number of an ultimate addressee and for producing said facsimile corespondence from said signals, means for identifying the telephone number of said ultimate addressee of said facsimile correspondence comprising sensor means adjacent a path taken by said facsimile corespondence for detecting symbols on said facsimile correspondence indicative of said telephone number of said ultimate addressee, means for memorizing the identified telephone number and for outputting a coded signal representing said identified telephone number, means for outputting a dialing signal to a telephone exchange in response to said coded signal, to connect a line with the identified telephone receiver, announcing machine means which starts operation in response to a connection signal output by said telephone exchange, to transmit a message including a notice of the arrival of said facsimile to said ultimate addressee, and means for disconnecting said line from said identified telephone receiver when said identified telephone receiver is hooked after it is once unhooked or said line is not connected with said identified telephone receiver.

2. Equipment for receiving a facsimile correspondence and for notifying an ultimate addressee of a plurality of ultimate addressees of the arrival of said correspondence comprising:

receiving means for receiving signals representing a message and a telephone number of an ultimate addressee and for producing said facsimile correspondence from said signals, means for identifying the telephone number of said ultimate addressee of said facsimile correspondence comprising sensor means adjacent a path taken by said facsimile correspondence for detecting symbols on said facsimile correspondence indicative of said telephone number of said ultimate addressee, means for memorizing the identified telephone number and for outputting a coded signal representing said identified telephone number, means for outputting a dialing signal to a telephone exchange in response to said coded signal to connect a line with the identified telephone receiver, means for causing said dialing signal outputting means to repeat the dialing signal outputting operation in cases where a line is not connected with said identified telephone receiver, announcing machine means which starts operation in response to a connection signal which is outputted by said telephone exchange to transmit a message including a notice of the arrival of said facsimile correspondence to said ultimate addressee, means for inhibiting the operation of said telephone number identifying means during the period wherein a call is being carried out, and means for disconnecting said line from said identified telephone receiver in response to a call completion signal.

3. Equipment for receiving a facsimile correspondence and for notifying an ultimate addressee of a plurality of ultimate addressees of the arrival of said correspondence comprising:

receiving means for receiving signals representing a message and a telephone number of an ultimate addressee and for producing said facsimile correspondence from said signals, means for identifying the telephone number of said ultimate addressee of said facsimile correspondence comprising sensor means adjacent a path taken by said facsimile correspondence for detecting symbols on said facsimile correspondence indicative of said telephone number of said ultimate addressee, and for outputting a coded signal representing said identified telephone number, two units of combined means each of which comprises (i) means for memorizing said identified telephone number, (ii) means for outputting a dialing signal to a telephone exchange in response to said coded signal to connect a line with said identified telephone receiver, (iii) means for causing said dialing signal outputting means to repeat the dialing signal outputting operation in cases where a line is not connected with said identified telephone receiver, (iv) announcing machine means which starts operation in response to a connection signal, and (v) means for disconnecting said line from said identified telephone receiver in response to a call completion signal, and means for selective distribution of the output coded signals of said telephone number identifying means, consisting of (i) a first subunit which further consists of a circuit which inhibits a coded signal which has been inputted to said first subunit, from being inputted to a second subunit and a circuit which inhibits any coded signal from being inputted to said first subunit during the period in which the first one of said combined means is operating and (ii) said second subunit which further consists of a circuit which inhibits a coded signal which has been inputted to said first subunit, from being inputted to said second subunit and a circuit which inhibits any coded signal from being inputted to said second subunit during the period in which the second one of said combined means is operating.

4. Equipment according to claim 1 wherein said sensor means further detects a predetermined symbol associated with the telephone number.

5. Equipment according to claim 4 wherein said symbol preceeds said telephone number.

6. Equipment according to claim 5 wherein said symbol also follows said telephone number.

7. Equipment according to claim 4 wherein said predetermined symbol is a graphic character.

8. Equipment according to claim 1 wherein said sensor means comprises an optical character reader.

9. Equipment according to claim 1 wherein said sensor means comprises a mark sensor.

10. Equipment according to claim 2 wherein said sensor means comprises an optical character reader.

11. Equipment according to claim 2 wherein said sensor means comprises a mark sensor.

12. Equipment according to claim 3 wherein said sensor means comprises an optical character reader.

13. Equipment according to claim 3 wherein said sensor means comprises a mark sensor.

* * * * *